O. M. PADDLEFORD.
LOCK.
APPLICATION FILED JAN. 22, 1920. RENEWED DEC. 13, 1920.
1,367,086.
Patented Feb. 1, 1921.
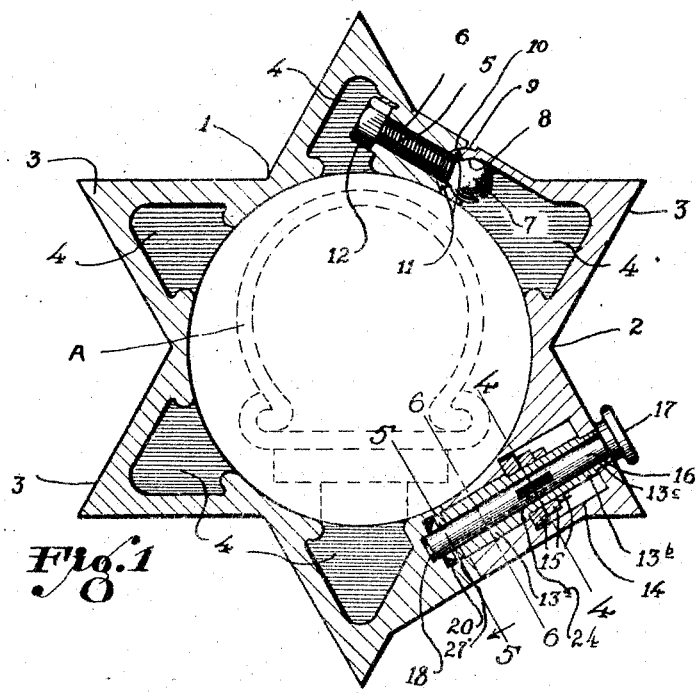
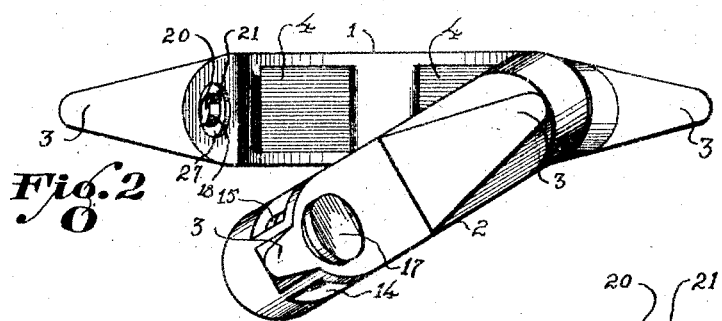
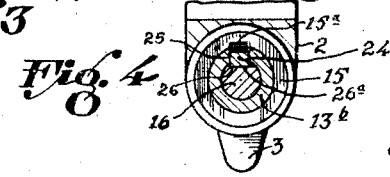
Inventor,
Oliver M. Paddleford,
By Raymond [illegible] Shatterlee,
Attorney.

UNITED STATES PATENT OFFICE.

OLIVER M. PADDLEFORD, OF LOS ANGELES, CALIFORNIA.

LOCK.

1,367,086.     Specification of Letters Patent.     Patented Feb. 1, 1921.

Application filed January 22, 1920, Serial No. 353,180. Renewed December 13, 1920. Serial No. 430,550.

*To all whom it may concern:*

Be it known that I, OLIVER M. PADDLEFORD, a citizen of the United States, residing at Los Angeles, in the county of Los Angeles and State of California, have invented new and useful Improvements in Locks, of which the following is a specification.

The present invention relates to a theft preventing device for automobiles and other vehicles, and has for its object to provide a device of this character which encircles the tire and wheel rim and is provided with a series of projections arranged in such a manner that at least one of the projections is always in operative position at the tread of the tire, thereby rendering it impossible to turn the device into inoperative position by the subterfuge of deflating the tire to which the device is applied.

Further objects of the invention are to provide an automobile theft signal of this general character which is comparatively simple and inexpensive in its construction, which can be quickly placed in position or removed therefrom, which does not have to be manufactured in a special size for each different size of tire, since it is operative in any position upon the tire and cannot be turned into inoperative position, and which is light in weight so that it can be easily handled.

With these and other objects in view the invention consists in certain combinations and arrangements of the parts as will more fully appear as the description proceeds, the novel features thereof being pointed out in the appended claims.

For a full understanding of the invention reference is to be had to the following description and accompanying drawing in which:

Figure 1 is a sectional view through a theft preventing device constructed in accordance with the invention, the position of the tire and wheel member within the same being indicated by dotted lines;

Fig. 2 is a side elevation of the theft preventing device with the keeper or gate portion thereof shown as swinging laterally into a partially open position;

Fig. 3 is an enlarged detail view of the inner end of the lock bolt, portions being broken away and shown in section to illustrate the mounting of the spring-acting detents which are carried by the said bolt or shaft of the lock;

Fig. 4 is a sectional view on the line 4—4 of Fig. 1;

Fig. 5 is a similar view on the line 5—5 of Fig. 1, looking in the direction of the arrow; and, Fig. 6 is a sectional view on the line 6—6 of Fig. 1.

Corresponding and like parts are referred to in the following description and indicated on all of the views of the drawing by like reference characters.

In carrying out the invention I have provided an annulus or band which is of a sufficient size to encircle the tire and rim of one of the wheels of the automobile or vehicle, and which is formed with a series of outwardly extending points or projections, said projections being arranged in such a manner that one of them will always be in operative position at the tread of the tire, regardless of the manner in which the device may creep or rotate upon the tire. The annulus is divided into complemental sections and includes a body portion 1 which is suitably curved or arched to embrace a portion of the tire and wheel rim, and a gate portion 2 which connects the ends of the body portion, said gate portion being pivotally connected to one end of the body portion and detachably connected to the opposite end of the body portion by a suitable lock. This lock may conveniently be of the same general character as that disclosed in my co-pending application which was filed June 10, 1919, and bears Serial Number 303,007. The body portion 1 and gate portion 2 provide a complete annulus when the gate portion is closed, and both of the said members 1 and 2 are provided with a series of radially extending points or projections 3. These points 3 are preferably hollow, being formed with cavities 4, which, wherever possible, may open through the inner wall of the annulus, thereby facilitating the manufacture of the device. By constructing the annulus with its cavities 4 in the projections thereof the use of unnecessary metal is avoided and the weight of the device decreased without materially detracting from the strength and efficiency thereof.

The pivotal connection between the gate portion 2 and the body 1 is shown as provided by a pivot pin 5 which is arranged substantially in a tangential relation to the opening of the annulus. The pivot pin 5 is received within an opening 6 in one end of the body portion 1 and formed with a rounded head 7 which fits loosely within a corresponding socket 8 in the adjacent end of the gate 2. The walls of the socket 8 form a knob 9 which is loosely received within a corresponding depression 10 in the end of the body portion 1, thereby providing a construction which renders it impossible to reach the pivot pin 5 with a hack saw or similar tool when the device is locked. The opening 11 through the knob 9 at the end of the gate 2 is slightly flared so that the gate is permitted to have a very limited swinging movement in the plane of the annulus, after which it is opened by swinging it transversely away from the plane of the annulus about the pin 5 as a pivot center, in the manner indicated by Fig. 2. The opposite end of the pivot pin is shown as capped by a nut 12. With this construction it will be obvious that the pivot pin 5 can be inserted in position or removed therefrom through the open inner ends of the cavities 4 provided in the projections 3, although it is inaccessible when the locking device is applied to the tire and wheel rim of an automobile.

The opposite end of the gate 2 is provided with a substantially tangential opening within which a tubular bushing 13 is fitted. This bushing has a square inner end 13$^a$ which locks the bushing against rotation, and also has a cylindrical intermediate portion 13$^b$ and a reduced end portion 13$^c$ providing a shoulder which renders it impossible for the bushing to be removed from position in any other manner than through the swinging end of the gate. This construction makes it impossible to remove the bushing when the gate 2 is closed and the annulus locked. The cylindrical portion 13$^b$ of the bushing extends through an opening 14 which is provided in one of the projections 3 and extends laterally through the same from one side thereof to the opposite side thereof. A series of permutation disks 15 are loose upon this cylindrical portion 13$^b$ of the bushing and arranged within the opening 15 so that they can be easily turned by the fingers of the operator.

A locking bolt 16 is rotatable within the bushing 13 and held against longitudinal movement, the outer end of the locking bolt terminating in a finger-piece 17 arranged at the exterior of the annulus, while the inner end thereof is adapted to enter a recess 18 in the end of the body portion 1, and is provided with laterally projecting detents 19 arranged to engage the under cut inner end of the recess. When these lateral detents 19 are rotated into registry with longitudinal channels 21 formed in the sides of the recess 18 the locking bolt can be withdrawn from the said recess. The looseness or play provided at the pivotal connection between the gate 2 and body portion 1 is just sufficient in amount to admit of the projecting end of the locking bolt being withdrawn from the recess 18, after which the gate 2 can be swung laterally into an open position to admit of the device being applied to an automobile tire or removed therefrom. In Fig. 1 the position of a tire and wheel rim within the locking device is indicated by the dotted lines A.

The detents 19 of the locking bolt are shown as slidably mounted within a transverse opening 22 and as normally held in a projected position by a coil spring 23. The outer ends of the detents are beveled at 19$^a$ so that the lock can be snapped into a closed position without the necessity of first rotating the bolt 16 to bring the detents into registry with the side channels 21 of the recess 18. With the present construction it is merely necessary to swing the gate 2 into a closed position with the end of the locking bolt 16 opposite to the recess 18, after which the swinging end of the gate can be forcibly moved toward the body portion and the lock snapped. If the detents 19 do not happen to be in registry with the side channels 21 of the recess the beveled ends 19$^a$ of the detents will cause them to be moved backwardly into inoperative position until the gate is completely closed, at which time the detents will spring outwardly into operative engagement with the under cut portion 20 of the recess. It is then impossible to open the gate until after the locking bolt 16 has been rotated to bring the detents 19 into registry with the channels 21.

The locking means used in connection with the bolt 16 includes a key member 24 which is slidable within a slot 25 in the bushing 13 and is adapted to engage the slot 26 in the bolt 16. The before-mentioned permutation disks 15 are provided with notches 15$^a$ which are adapted to be rotated into registry with the slot 25 of the bushing 13, after which the key member 24 can be moved outwardly into the said notches and disengaged from the slot 26 of the bolt, thereby enabling the bolt to be turned in the necessary manner to unlock the device. One side of the slot 26 in the locking bolt may be flattened or given a cam formation at 26$^a$ so that after the permutation disks 15 have all been properly positioned the key 24 will be automatically moved outwardly into inoperative position when the locking bolt 16 is rotated in the proper direction. As previously explained, this is the same general type of lock which is disclosed in my co-pending application Serial Number 303,007, filed June 10, 1919. The end of the bushing 13 may project slightly beyond the end of the gate 2 and be received in a socket 27 in the body portion 1 when the lock is closed, thereby rendering it impossible to reach the locking bolt 16 with a hack saw or similar tool. The detents 19 may be held in position in any suitable manner as by means of the pins 28 which are illustrated on the drawing. The device is intended to be applied to the tire and rim of a wheel as indicated by Fig. 1, and it will be obvious that one of the projections 3 will always be in operative position at the tread of the tire, regardless of the position of the device. It is not necessary for the device to be constructed in such a manner as to have a close fit upon the tire, and one side of the lock may be used in connection with several sizes of tires. From a commercial view-point this is an important advantage over the previously used locks of this character which are constructed with but a single projection, and which must fit the tire closely in order to hold the one projection in operative position. With my construction a merchant need only carry a few sizes of the lock in stock, while with the previous construction it is necessary to carry a special size lock in stock for every different size of tire. Manufacturing costs and overhead expenses are thus very greatly decreased, and at the same time a more efficient theft preventing device is provided.

Having thus disclosed my invention, I claim and desire to secure by Letters Patent:

1. A vehicle theft preventing device, including an annulus adapted to encircle the tire and formed in complemental sections, a pivot pin hingedly connecting the sections and arranged in the plane of the annulus in a substatially tangential relation thereto, locking means between the complemental sections of the annulus, and a series of projections extending around the annulus and arranged so that at least one of the projections will always be in operative position at the tread of the tire, regardless of the position of the annulus thereon.

2. A vehicle theft preventing device, including an annulus adapted to encircle the tire and formed in complemental sections, each of the complemental sections being provided with a series of outwardly extending hollow projections of which the chambers open through the inner periphery of the annulus, a pivot pin connecting the complemental sections and arranged substantially tangential to the annulus with the ends thereof in the chambers of adjacent hollow projections, and locking means between the complemental sections of the annulus.

3. A vehicle theft preventing device, including an annulus adapted to encircle the tire and formed in complemental sections, said sections being each provided with a series of hollow projections of which the chambers open through the inner periphery of the annulus, a pivot pin connecting the complemental sections and arranged substantially tangential to the annulus with the ends thereof within adjacent hollow projections, one of the complemental sections being formed at the pivot point with a knob, while the other section is formed with a corresponding depression surrounding the pivot pin, and locking means between the opposite ends of the complemental sections.

4. A vehicle theft preventing device, including an annulus adapted to encircle the tire and formed in complemental sections, a pivot pin connecting the complemental sections and arranged substantially tangential to the annulus, the free ends of the complemental sections having a limited play toward and away from each other and one of the complemental sections swinging laterally about the pivot pin into open and closed positions, and locking means carried by the free end of one of the complemental sections for engaging the corresponding end of the other complemental section.

5. A vehicle theft preventing device, including an annulus adapted to encircle the tire and formed in complemental sections, a pivot pin connecting the complemental sections and arranged substantially tangential to the annulus, one of said sections having a limited swinging movement toward and away from the other section and being rotatable laterally about the pivot pin into open and closed positions, and a tangentially disposed locking bolt carried by the swinging end of said section and normally projecting laterally from the end thereof, the before-mentioned limited movement of the said section being sufficient to disengage the projecting end from the other section preparatory to swinging the section into open position, the said other section being recessed to receive the locking bolt.

6. A vehicle theft preventing device, including an annulus adapted to encircle the tire and formed in complemental sections, a tangentially disposed pivot pin connecting the sections, one of the said sections having a limited movement toward and away from the other section and being rotatable laterally about the pivot pin into open and closed positions, a tangentially disposed bushing fitted in the free end of one of the said sections and held in position by the other section when the two sections are closed, and a locking bolt rotatably mounted in the bushing and normally projecting beyond the same for engagement with the other section, the before-mentioned limited movement of the sections enabling the locking bolt to be disengaged from the other section preparatory to moving the swinging section into an open position.

7. A vehicle theft preventing device, including an annulus adapted to encircle the tire and formed in complemental sections, a tangentially disposed pivot pin connecting the sections, said sections having a limited movement toward and away from each other and one of said sections being adapted to swing laterally about the pivot pin into open or closed position, a tubular bushing fitted in a free end of one of the sections and held in position by the other section when the annulus is closed, said bushing having a polygonal end to prevent rotation thereof, and a locking bolt rotatable in the bushing and projecting beyond the same for engagement with the other section of the annulus, the before-mentioned limited movement of the sections permitting them to be moved to clear the locking bolt, after which the swinging section can be moved into open position.

8. A vehicle theft preventing device, including an annulus adapted to encircle the tire and formed in complemental sections, a tangentially disposed pivot pin loosely connecting the sections and permitting a limited movement toward and away from each other, one of said sections being adapted to swing laterally about the pivot pin into open and closed positions, a tangentially disposed tubular bushing fitted in a free end of one of the sections of the annulus and held in position by the other section of the annulus, said bushing projecting slightly beyond the section in which it is fitted and the other section having a socket to receive the projecting end of the bushing, and a locking bolt rotatably mounted in the tubular bushing and projecting beyond the same for engagement with the other section of the annulus, the before-mentioned limited movement of the two sections enabling the projecting end of the locking bolt to be cleared, after which the swinging section of the annulus can be moved into an open position.

In testimony whereof, I have signed my name to this specification in the presence of two subscribing witnesses.

OLIVER M. PADDLEFORD.

Witnesses:
 HUGH S. HILL,
 MILDRED LEACH.